UNITED STATES PATENT OFFICE.

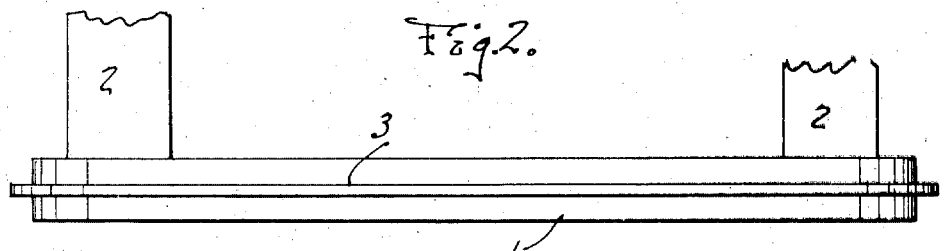
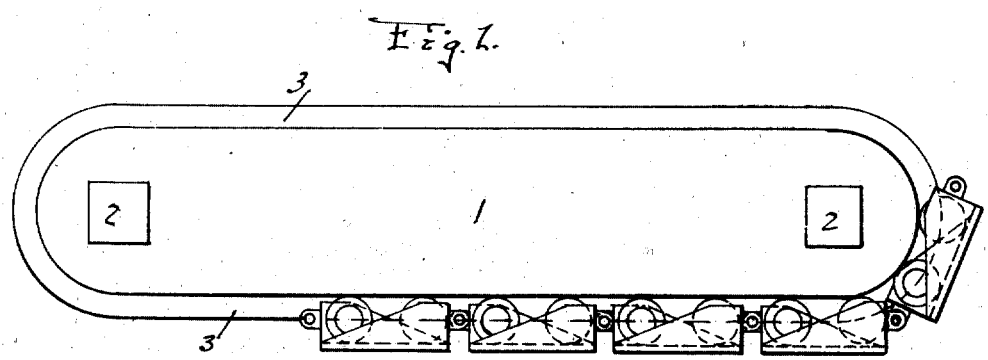
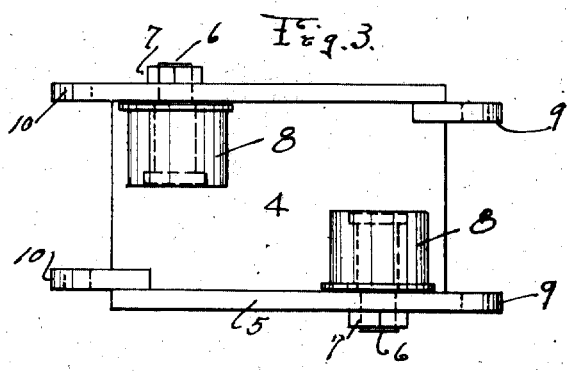
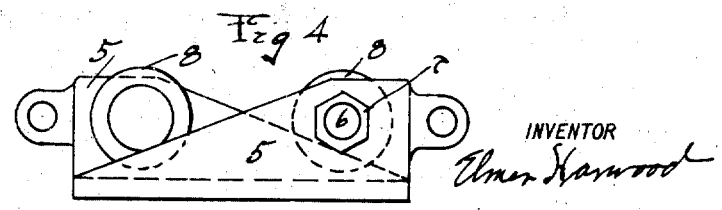

ELMER HARWOOD, OF GRANITE FALLS, WASHINGTON.

TRACTOR-VEHICLE.

1,246,742.

Specification of Letters Patent.

Patented Nov. 13, 1917.

Application filed June 18, 1917. Serial No. 175,264.

*To all whom it may concern:*

Be it known that I, ELMER HARWOOD, a citizen of the United States, residing at Granite Falls, in the county of Snohomish and State of Washington, have invented certain new and useful Improvements in Tractor-Vehicles, of which the following is a specification.

This invention relates to caterpillar vehicles and has for its principal object to provide an improved and novel type of caterpillar vehicle construction which embodies improved tractor chain units. Another object of my invention is to provide an improved and novel chain construction for caterpillar vehicles.

Other objects will appear as my invention is more fully explained in the following specification, illustrated in the accompanying drawings and pointed out in the appended claims.

In the drawings, Figure 1 is a side elevation of a caterpillar truck showing several links of new improved chain in position. Fig. 2 is a plan of the truck runner. Fig. 3 is an enlarged plan of one of the chain links. Fig. 4 is a side elevation of same.

Referring more particularly to the drawings, numeral 1 indicates a truck side frame. A pair of these truck side frames are joined together by means of struts 2 to form a truck. The truck may be provided with bolsters or other means of supporting a load. The side frames 1 are each provided with an extending central rib 3 which extends out beyond the tread surface of side frames. The caterpillar chain is formed of a series of similar link units which are joined together into an endless chain. The link units include a body 4 having upstanding and parallel sides 5. The parallel sides are triangular in shape and are oppositely disposed. From the wider end of each side, a stationary stub shaft 6 extends inwardly and is secured to the side by means of a shoulder and a nut 7. Upon each stub shaft, a roller 8 is revolubly mounted. It will be noted that the inner ends of rollers 8 lie in separate planes which are some little distance apart. A chain is formed of the links as just described by hinging lugs 9 on one end of each link to lugs 10 on the other end of each link. The rib 3 of the side frame fits between the ends of rollers 8 and holds the chain in place on the side frame. The rollers 8 bear against the side frames on either side of rib 3 and roll around the side frame. The back of each link 4 forms the tread portion of the chain which comes in contact with the ground. The units of my chain are simple and economical of manufacture as each unit is preferably a drop forging upon which the rollers are mounted. The triangular shape of the sides make a link chain which is easily accessible in all its parts.

While I have shown a particular form of embodiment of my invention, I am aware that many minor changes therein will readily suggest themselves to others skilled in the art without departing from the spirit and scope of the invention, and I therefore desire to avoid being limited to the exact form shown and described. Having described my invention, what I claim as new and desire to protect by Letters Patent, is—

1. In a caterpillar chain, the combination of a link having triangular and upstanding parallel sides, a pair of similar rollers, one of which is revolubly mounted on the inside of each of said sides, the ends of said rollers lying in parallel planes which are spaced apart, and means for joining similar links to one another.

2. A caterpillar chain link comprising a flat body, oppositely disposed parallel sides, stub shafts extending inwardly from opposite ends of each of said sides, similar rollers, one of each of which is revolubly mounted upon each stub shaft, said rollers being of such length that their inner ends lie in parallel planes which are spaced somewhat apart, and lug means on either end of said sides, whereby a series of similar links may be connected into a chain.

In testimony whereof I affix my signature.

ELMER HARWOOD.